United States Patent [19]

Calvet et al.

[11] Patent Number: 4,668,445
[45] Date of Patent: May 26, 1987

[54] PROCESS FOR THE PRODUCTION OF A MULTIPOINT LIGHT GUIDE BY EXPANSION OF FIBERS IN A MOLD

[75] Inventors: Jean Calvet, Paris; Jean-Claude Cavan, Vincennes; Jean-Claude Thevenin, Velizy; Alain Fievet, Chaville, all of France

[73] Assignee: Commissariat a l'Energie Atomique, Paris, France

[21] Appl. No.: 736,684

[22] Filed: May 22, 1985

[30] Foreign Application Priority Data

May 23, 1984 [FR] France ................ 84 08058

[51] Int. Cl.4 .................................. B29D 11/00
[52] U.S. Cl. ........................ 264/1.5; 764/1.7; 764/2.6; 764/342 R; 764/343
[58] Field of Search .......... 264/1.5, 2.7, 230, 320, 264/343, 342 R, 1.7, 2.6; 425/808

[56] References Cited

FOREIGN PATENT DOCUMENTS 0108420 5/1984 European Pat. Off. .
2132047 1/1973 Fed. Rep. of Germany .
2533709 3/1984 France .

OTHER PUBLICATIONS

Patents Abstracts of Japan, vol. 7, No. 30 (P-173) [1175], 5 Fevrier 1983; & JP-A-57 181 510 (Mitsubishi Rayon K.K.) 09-11-1982.

Primary Examiner—James Lowe
Attorney, Agent, or Firm—Pearne, Gordon, McCoy & Granger

[57] ABSTRACT

Process for the production of a multipoint light guide and products obtained according to this process. This process consists of placing in a mold a bundle of plastics optical fibers obtained by drawing, said fibers being parallel and adjacent to one another and wherein the mold - bundle assembly temperature is homogeneously raised, in order to increase the diameter of the optical fibers until they fill the entire interior of the mold and e.g. assume a hexagonal shape, the thus treated bundle of optical fibers forming the light guide. It in particular makes it possible to obtain multipoint light guides combining both a transmission of images with a unity magnification and the enlargement or reduction thereof.

9 Claims, 2 Drawing Figures

PROCESS FOR THE PRODUCTION OF A MULTIPOINT LIGHT GUIDE BY EXPANSION OF FIBERS IN A MOLD

BACKGROUND OF THE INVENTION

The present invention relates to a process making it possible to obtain a multipoint light guide, while giving the same a particular shape. It also relates to the products obtained according to this process.

Multipoint light guides of the type in question are formed from well-ordered optical fiber groups. They are mainly used for image transmission purposes, each optical fiber transmitting an elementary point of said images.

These groups or bundles of fibers have numerous applications. In particular, they can be used in the medical field and particularly for endoscopy associated with an entry optics. They can also be used in the electronics and display fields, particularly in the form of optical coupling wafers used e.g. for correcting the curvature of images, in order to obtain a planar image from a cathode ray tube screen or to ensure the connection between a planar persistent screen and the curved photocathode of an image amplifier.

Apart from their use for the transmission of images, as a function of their shapes, these multipoint light guides can also be used for increasing or decreasing the size of images. Image enlargers or reducers are known constituted by well-ordered optical fibers in the form of a conical bundle, whereof the entry diameter and the exit diameter characterize the enlargement or reduction of said means.

The various multipoint light guide types described hereinbefore are generally produced with glass or silica optical fibers, said materials having good optical transmission characteristics (transparency). However, these optical fibers suffer from the disadvantages of being expensive, heavy and relatively inflexible.

The known glass fiber light guides are generally produced either directly by an assembly of well-ordered optical fibers followed by hot, pressurized compacting, or by an assembly of elementary groups of optical fibers obtained by successive drawing or stretching operations.

These processes for the production of light guides suffer from a certain number of disadvantages and particularly their relatively complex and costly realization. For example, the use of glass fibers requires a high working temperature exceeding 600° C. When compacting under pressure between the two parts of a mold, difficulties occur at the junction between these two parts. For the production of image reducers, it is necessary to draw a group of fibers and remove a portion of the drawing cone. Moreover, these processes significantly limit the applications of the multipoint light guides obtained.

SUMMARY OF THE INVENTION

The present invention relates to a process for the production of multipoint light guides making it possible to obviate the aforementioned disadvantages. It more particularly makes it possible to produce light guides in a simple, inexpensive manner and they can be used for the transmission of images, as well as the enlargement or reduction thereof.

The present invention specifically relates to a process for the production of a multipoint light guide, wherein within a mold is arranged a bundle of optical fibers made from a plastics material, having a core and an optical sheath, whose production involves a drawing operation, said fibers being parallel and adjacent to one another, and wherein the temperature of the mold-bundle assembly is homogeneously increased in order to increase the diameter of the optical fibers until they occupy the entire interior of the mold, the bundle of fibers treated in this way forming the light guide.

The process according to the invention is based on one of the physical properties of certain optical fibers made from a plastics material, whereof the production process involves the drawing of fibers, e.g. from a blank.

Thus, plastics materials are not products having a clearly defined melting point and their viscosity varies in accordance with a wide temperature range. Thus, during the pulling of plastics materials forming the optical fibers, during the production thereof the molecular structure of the plastics materials, during cooling, sets as a drawn or stretched structure. This can be more or less pronounced, as a function of the production conditions for the optical fibers and particularly the lowest drawing temperature used. This drawn molecular structure makes it possible to give the optical fibers certain mechanical properties and particularly flexibility properties.

It has been found that this drawn molecular structure has a tendency to reassume its original shape (i.e. prior to drawing), during an adequate heating of the plastics materials of these fibers, leading to a diameter increase of the latter, linked with a shortening thereof. It is this property of certain plastics optical fibers which is utilized in the invention.

As plastics optical fibers which can undergo a diameter increase on heating them, reference is more particularly made to those having an optical polyvinyl acetate sheath and a polystyrene core. These optical fibers can be obtained by pulling at relatively high temperatures, particularly close to 190° C.

Such plastics optical fibers, as well as their production process by drawing have been described in French Pat. No. 2,533,709, filed on Mar. 30, 1984, in the name of the present Applicant.

According to the invention, the optical fibers used need not have a mechanical protective covering.

Moreover, according to the envisaged application, the process according to the invention can comprise a supplementary stage consisting of demolding the bundle of plastics optical fibers obtained following the temperature rise stage.

If it is wished to produce optical coupling wafers it is possible, according to the invention, for demolding of the bundle of optical fibers to be followed by the cutting of said bundle in a direction perpendicular thereof in order to form the same wafers.

If it is wished to produce a multipoint light guide permitting the transmission of images with unity magnification, it is possible according to the invention to use a mold having a cylindrical recess which has a constant diameter.

If it is wished to produce multipoint light guides which, apart from the transmission of images, are to permit the enlargement or reduction thereof, according to the invention it is possible to use a mold having a cylindrical recess with a variable diameter and in particular a mold having a recess with a frustum-shaped portion.

According to the invention, the different multipoint light guides referred to hereinbefore can have fluorescent or scintillating properties. To this end, use is made of plastics optical fibers, whereof the core material contains fluorescent or scintillating doping products. Such light guides can be used for the detection and/or location of particles.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
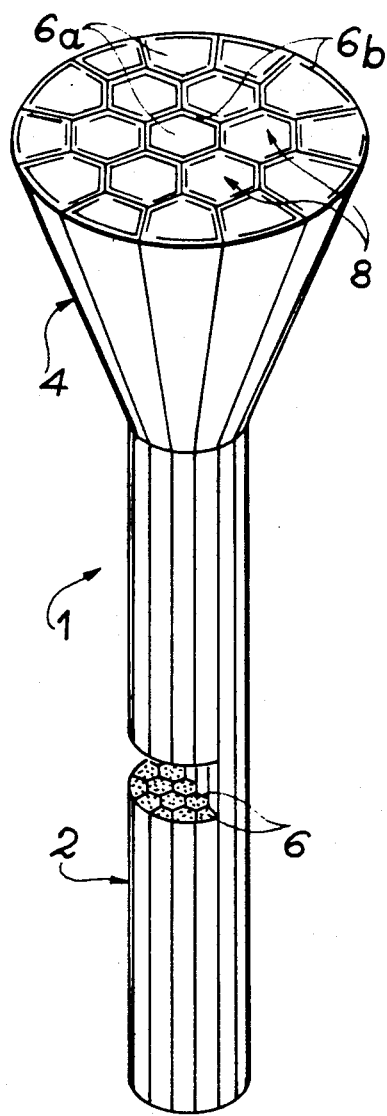
FIG. 1 diagrammatically, a multipoint light guide according to the process according to the invention used both for the transmission of images and for the enlargement or reduction thereof.

The light guide production process according to the invention firstly consists of using a bundle of well-ordered optical fibers made from a plastics material and obtained by drawing from a blank. These optical fibers are arranged parallel and adjacent to one another. The optical fibers can e.g. be those described in the aforementioned French patent application. These fibers have in particular a polyvinyl acetate optical sheath and a polystyrene core.

When the optical fibers used are provided with mechanical protective covering, they can according to the invention be bared over all or part of their length. Following this baring of the optical fibers, the fiber bundle can be introduced into a mold. Then, according to the invention, the temperature of the mold-fiber bundle assembly is homogeneously raised, so as to increase the diameter of the optical fibers until they occupy the entire volume available to them. In particular, said heated optical fibers fill the entire inside of the mold and particularly the optical vacuums present initially between the circular optical fibers, so that in most cases a multipoint light guide is obtained which has optical fibers with a hexagonal cross-section arranged in honeycomb form.

In the case of plastics optical fibers having a polyvinyl acetate sheath and a polystyrene core obtained by pulling at a temperature of approximately 190° C., the filling of the entire mold and the obtaining of a hexagonal shape of the optical fibers can be obtained by homogeneously raising the temperature to approximately 130° to 140° C.

The raising of the temperature can take place with the aid of a conventional apparatus (e.g. an oven) by directly heating the mold containing the optical fibers. The following stage of the inventive process consists of demolding the multipoint light guide obtained.

The process according to the invention makes it possible to obtain multipoint light guides used for the transmission of images and having a unity magnification. This can be obtained by using a tubular mold, i.e. a mold having a cylindrical recess with a constant diameter.

According to the invention, it is possible to cut the multipoint light guide obtained in a direction perpendicular to the fiber bundle constituting said guide so as to form optical coupling wafers of limited thickness, which can be used in the electronics and display fields.

The process according to the invention can also make it possible to produce image reducers or enlargers. This can be obtained by using a mold with a cylindrical recess, which has a variable diameter and in particular a frustum-shaped recess, bearing in mind that the plastics material optical fibers when heated can fill the entire space provided for them by a diameter increase of said fibers.

Obviously, the increase in the diameter of the plastics optical fibers is limited. For example, in the case of optical fibers having a polyvinyl acetate sheath and a polystyrene core obtained by drawing at 190° C., it is possible to obtain a factor of three diameter increase of the fibers by homogeneous heating at about 140° C. It should be noted that this increase in the diameter of the fibers is accompanied by a reduction in length proportional thereto. For a diameter increase by a factor of 3, there is a reduction in length by a factor of 9.

Due to the very principle of the process according to the invention, it is possible to obtain in the manner shown in FIG. 1 a multipoint light guide combining both a transmission of images with a unity magnification, as well as an enlargement or reduction thereof, without interrupting the optical fibres. Light guide 1 has a constant diameter cylindrical part 2 permitting the transmission of images with a unity magnification, together with a frustum-shaped part 4, integral with part 2, permitting the enlargement or reduction of the images. The plastics optical fibers 6 have a core 6a and an optical sheath 6b, constituting said light guide with a hexagonal honeycomb shape 8 obtained according to the process of the invention.

It should be noted that the prior art processes do not make it possible to produce such a light guide without interruption of the optical fibers forming the same.

Figure 2:
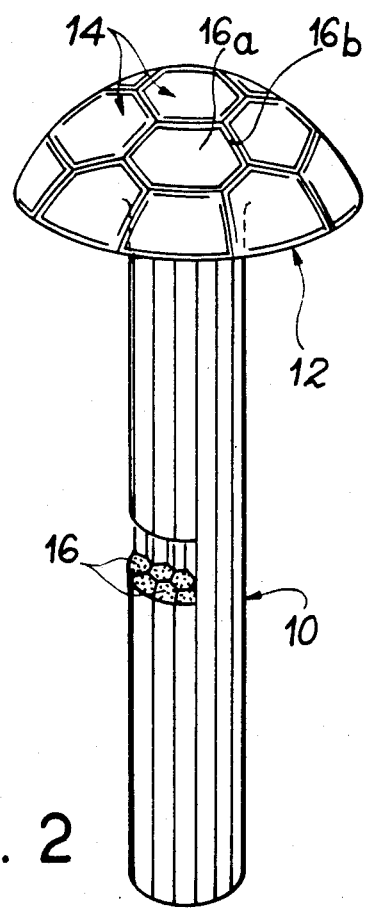
FIG. 2 diagrammatically, a multipoint light guide obtained according to the process of the invention and shaped like a fly eye.

In the case of a mold having a cylindrical recess with a variable diameter, it is also possible to produce a fly eye, as shown in FIG. 2, i.e. a multipoint light guide comprising a constant diameter cylindrical part 10 and a hemispherical part 12 having, as the fly eye, contiguous, hexagonal facets 14. This light guide is formed from plastics optical fibers 16 having a core 16a and an optical sheath 16b. It can be used for the rough observation of the displacements of a light source in a solid angle of $2\pi$, or for illumination in a solid angle of $2\pi$, from a light source emitting in the axis of the cylindrical fiber bundle, e.g. a laser source.

According to the invention, it is also possible to produce multipoint light guides with a random shape having luminescent or fluorescent properties. To this end, use is made of plastics optical fibers, whereof the core material contains fluorescent or scintillating doping elements, such as for example the compound known as butyl-PBD or that known as dimethyl-POPOP, as described in the aforementioned patent application. The light guides can in particular be used for the detection and/or location of particles.

The process according to the invention makes it possible to obtain multipoint light guides of all imaginable shapes by simply increasing the size of the plastics optical fibers by a predetermined volume, by using a heating stage. This involves no compacting of the fibers, as in the prior art processes. This process has the advantage of being simple and inexpensive to perform, unlike in the case of the prior art processes.

For example, it is possible to produce a light guide having a plurality of aligned points by introducing a band or tape formed from juxtaposed fibers in the form of a single layer into a mould having a rectagular section and by raising the temperature. In this case, the fibers assume a square or rectangular cross-section.

What is claimed is:

1. A process for the production of a multipoint light guide comprising the steps of:

arranging within a mold a bundle of optical fibers made from a plastics material, having a core and an optical sheath, whose production involves a drawing operation, said fibers being parallel and adjacent to one another; and homogeneously increasing the temperature of the mold-bundle assembly in order to increase the diameter of the optical fibers without melting said fibers until they expand to occupy the entire interior of the mold, the mold restricting further expansion, the bundle of fibers treated in this way forming the light guide.

2. A production process according to claim 1, adapted to a multipoint light guide in which the optical fibers are provided with a mechanical covering, comprising the step of removing the mechanical covering on at least the parts of the optical fibers arranged in the mold.

3. A process according to claim 1, further comprising the step of demolding the treated bundle of optical fibers.

4. A process according to claim 3, comprising the step, following the demolding of the treated bundle of optical fibers, of cutting this bundle in a direction perpendicular thereto, in order to form optical coupling wafers.

5. A process according to claim 1, wherein the optical fibers have a polyvinyl acetate optical sheath and a polystyrene core.

6. A process according to claim 5, wherein the fiber core contains scintillating or fluorescent doping products.

7. A process according to claim 1, wherein the mold has a cylindrical recess having a constant diameter.

8. A process according to claim 1, wherein the mold has a cylindrical recess with a variable diameter.

9. A process according to claim 8, wherein the mold has a recess with a frustum-shaped portion.

* * * * *